(12) United States Patent
Zheng et al.

(10) Patent No.: US 12,211,231 B1
(45) Date of Patent: Jan. 28, 2025

(54) DETECTION OF ON-ROAD OBJECT POSITION USING MARKERS

(71) Applicant: PlusAI, Inc., Santa Clara, CA (US)

(72) Inventors: Hao Zheng, Saratoga, CA (US); Anurag Ganguli, Saratoga, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 18/624,820

(22) Filed: Apr. 2, 2024

(51) Int. Cl.
*G06T 7/70* (2017.01)
*B60W 30/09* (2012.01)
*G06T 7/20* (2017.01)
*G06T 7/80* (2017.01)

(52) U.S. Cl.
CPC .............. *G06T 7/70* (2017.01); *B60W 30/09* (2013.01); *G06T 7/20* (2013.01); *G06T 7/80* (2017.01); *G06T 2207/20081* (2013.01); *G06T 2207/30204* (2013.01)

(58) Field of Classification Search
CPC .... G06T 7/70; G06T 7/20; G06T 7/80; G06T 2207/20081; G06T 2207/30204; B60W 30/09
See application file for complete search history.

(56) References Cited

U.S. PATENT DOCUMENTS

| | | | | |
|---|---|---|---|---|
| 8,340,356 B2 * | 12/2012 | Lehning | ................ | G01S 7/4972 356/27 |
| 9,969,486 B1 * | 5/2018 | O'Brien | ..................... | G06T 7/80 |
| 10,930,155 B2 * | 2/2021 | Swan | ...................... | G08G 1/164 |
| 2008/0040029 A1 * | 2/2008 | Breed | ..................... | G08G 1/161 701/514 |
| 2010/0322476 A1 * | 12/2010 | Kanhere | .............. | G06V 10/763 382/103 |
| 2015/0175161 A1 * | 6/2015 | Breed | ................... | B60W 30/08 348/148 |
| 2016/0004915 A1 * | 1/2016 | Chen | ..................... | G08G 1/0104 348/149 |
| 2016/0012589 A1 * | 1/2016 | Hamer | ................... | H04N 23/90 348/148 |
| 2017/0010618 A1 * | 1/2017 | Shashua | ................ | B60W 30/18 |
| 2017/0032526 A1 * | 2/2017 | Gao | ......................... | G06T 7/246 |
| 2018/0341812 A1 * | 11/2018 | Floor | ...................... | G06V 20/42 |
| 2020/0307563 A1 * | 10/2020 | Ghafarianzadeh | ..... | G06V 40/25 |
| 2021/0195097 A1 * | 6/2021 | Nikitin | ................... | H04N 23/64 |
| 2023/0132646 A1 * | 5/2023 | Ratti | ...................... | G06V 20/52 348/159 |

OTHER PUBLICATIONS

Pan, Fuquan ("Analysis of the Impact of Traffic Violation Monitoring on the Vehicle Speeds of Urban Main Road: Taking China as an Example") Journal of Advanced Transportation. 2020. (Year: 2020).*

* cited by examiner

*Primary Examiner* — Molly Wilburn
(74) *Attorney, Agent, or Firm* — Sheppard Mullin Richter & Hampton LLP

(57) ABSTRACT

Methods, systems, and non-transitory computer-readable media are configured to perform operations comprising detecting an object in sensor data captured in an environment; detecting a marker in the sensor data captured in the environment; and determining a first location of the object in the environment based on a relative location of the object to the marker and a second location of the marker.

20 Claims, 10 Drawing Sheets

DETECTION OF ON-ROAD OBJECT POSITION USING MARKERS

FIELD OF THE INVENTION

The present technology relates to infrastructure based perception systems. More particularly, the present technology relates to improved detection of location, velocity, and acceleration of on-road objects by infrastructure based perception systems using markers.

BACKGROUND

An ego vehicle having an autonomous system for navigation can plan a safe and efficient route based on an understanding of its environment. One fundamental challenge associated with this understanding is reliable detection of static and dynamic obstacles around the ego vehicle, such as other vehicles, pedestrians, road indications, traffic signs, and the like. Another fundamental challenge associated with this understanding is the accurate determination of the location of the ego vehicle in the environment.

SUMMARY

Various embodiments of the present technology can include methods, systems, and non-transitory computer readable media configured to perform operations comprising detecting an object in sensor data captured in an environment; detecting a marker in the sensor data captured in the environment; and determining a first location of the object in the environment based on a relative location of the object to the marker and a second location of the marker.

In some embodiments, the second location of the marker is in a map associated with the environment, and wherein the map includes information that describes at least one of a shape, a form, and a feature of the marker.

In some embodiments, the marker is in a set of markers, and the second location of the marker is determined based on a pattern associated with the set of markers.

In some embodiments, the operations further comprise: determining a third location of the object in the environment without distance estimation of the object with respect to a sensor in the environment; and determining a velocity of the object based on the first location and the third location.

In some embodiments, the operations further comprise: estimating an estimated location of the marker; comparing the estimated location of the marker with the second location of the marker; and calibrating a sensor associated with the sensor data based on the estimated location and the second location.

In some embodiments, the first location of the object is determined based on a machine learning model, and wherein the machine learning model is trained based on training data that include instances of sensor data captured at the environment with one or more markers.

In some embodiments, the operations further comprise: detecting a key point of the object, wherein the first location is determined based on the key point of the object.

In some embodiments, the relative location of the object to the marker is determined based on a number of pixels between a first pixel of the object in the sensor data and a second pixel of the marker in the sensor data.

In some embodiments, the operations further comprise: identifying the object based on the relative location of the object to the marker; and providing an identification of the object based on the relative location of the object to the marker.

In some embodiments, the operations further comprise: providing localization of the object with respect to a global map to a vehicle in the environment; and causing navigation of the vehicle to avoid the object based on the localization of the object.

It should be appreciated that many other embodiments, features, applications, and variations of the present technology will be apparent from the following detailed description and from the accompanying drawings. Additional and alternative implementations of the methods, non-transitory computer readable media, systems, and structures described herein can be employed without departing from the principles of the present technology.

Figure 1:
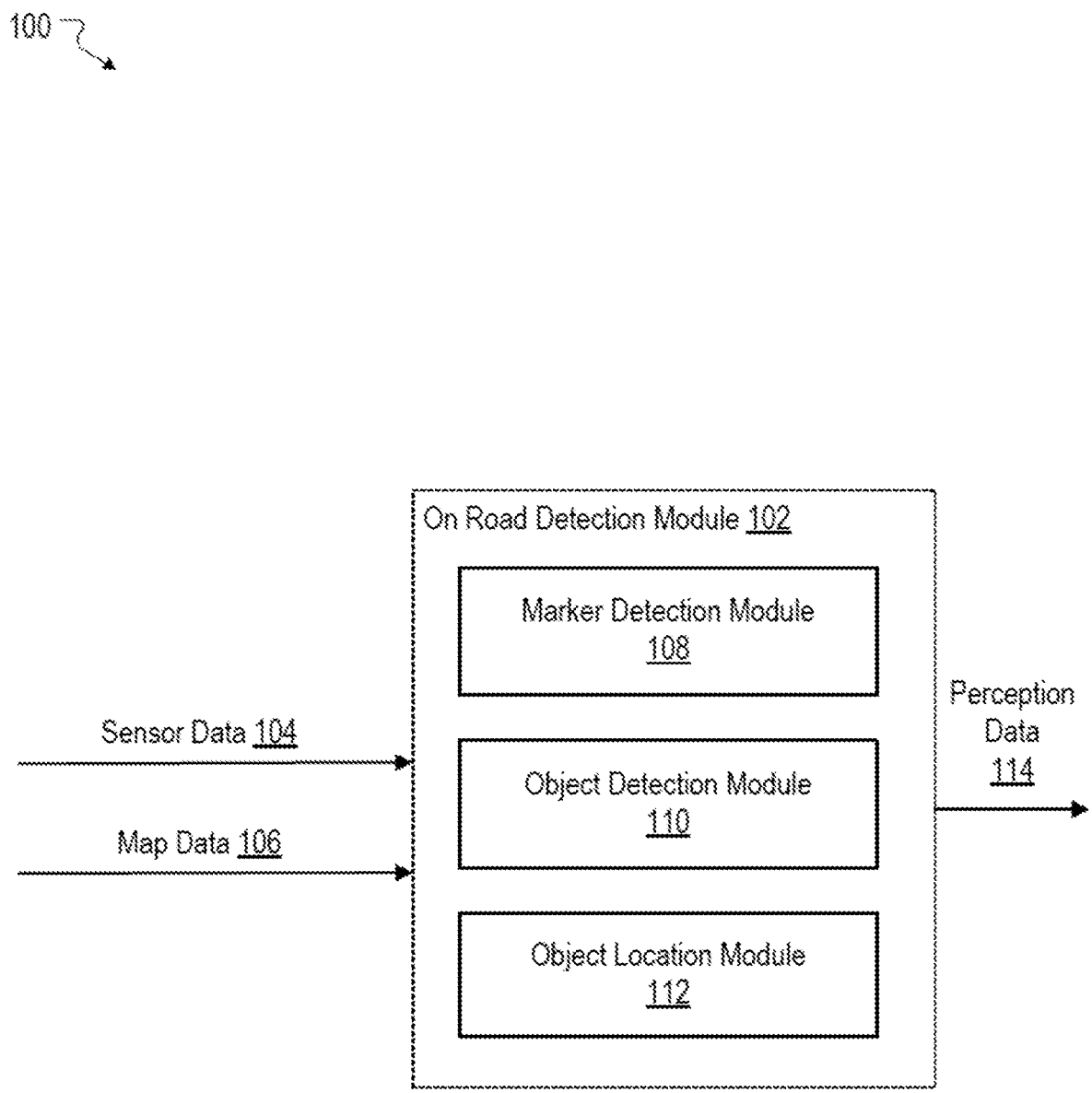
FIG. 1 illustrates an example system associated with improved detection of road objects using perception markers, according to embodiments of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

An ego vehicle having an autonomous system for navigation can plan a safe and efficient route based on an understanding of its environment. One fundamental challenge associated with this understanding is reliable detection of static and dynamic obstacles around the ego vehicle, such as other vehicles, pedestrians, road indications, traffic signs, and the like. Another fundamental challenge associated with this understanding is the accurate determination of the location of the ego vehicle in the environment.

Infrastructure based perception systems can supplement an understanding of an environment by providing information beyond what can be detected by a vehicle alone. However, under conventional approaches, infrastructure based perception systems face various technological challenges. For example, some sensors, such as LiDAR sensors and radar sensors, have limited range. Other sensors, such as cameras, have greater range but face other limitations. For example, error in distance estimation in stereo cameras can increase quadratically as distance increases. Thus, conventional approaches of infrastructure based perception systems can pose disadvantages with respect to range and accuracy. Due to these and other shortcomings, infrastructure based perception systems fail to efficiently and accurately provide information to reliably supplement an understanding of an environment. These technological disadvantages are significant because providing erroneous information to an autonomous system for navigation can cause the autonomous system to plan a route for a vehicle that is unsafe or inefficient.

The present technology provides improved approaches for infrastructure based perception systems that overcome the aforementioned and other technological disadvantages. In various embodiments, the present technology can provide accurate estimations of locations or positions of objects on a road based on specialized markers on the road. For example, specialized markers, such as solid lines, patterned lines, shapes, and poles, can be placed on or near a road. The markers can be separated from one another by selected distances or placed according to selected patterns. Sensors, such as cameras, can capture sensor data, such as images, of the road. The markers and objects on the road can be identified in the sensor data. The objects on the road can be evaluated based on relative locations of the objects on the road in relation to the markers on the road. Based on the relative locations between the objects on the road in relation to the markers on the road and based on the locations of the markers, locations of the objects can be determined. When the locations of the objects are determined at different times, velocities of the objects can be determined. Likewise, accelerations of the objects can be determined when velocities of the objects are determined at different times.

As an example, a camera of an infrastructure based perception system can capture images of an environment that includes a road. The road can include a set of solid line markers. Each solid line marker can extend laterally across the road. The images of the environment captured by the camera can include an object, such as a vehicle, travelling on the road. The infrastructure based perception system can detect the vehicle on the road in the images. The infrastructure based perception system can identify a subset of the set of solid line markers based on the vehicle detected in the images. For example, the subset of solid line markers can include two solid line markers nearest the vehicle. The infrastructure based perception system can determine relative locations of the vehicle in relation to the subset of solid line markers. Based on the relative locations of the vehicle and locations of the subset of solid line markers, a location of the vehicle can be determined. The locations of the subset of solid line markers can be determined from, for example, map data that stores the locations of the set of solid line markers. In this example, the vehicle can be determined to be at a first relative location with respect to a first solid line marker of the subset of solid line markers and a second relative location with respect to a second solid line marker. The first solid line marker can be at a first location known to the camera or the associated infrastructure based perception system. The second line marker can be at a second location known to the camera or the associated infrastructure based perception system. Based on the first relative location of the vehicle in relation to the first solid line marker, the second relative location of the vehicle in relation to the second solid line marker, the first location of the first solid line marker, and the second location of the second solid line marker, an estimated location of the vehicle and a distance of the vehicle away from the camera of the infrastructure based perception system can be determined. In accordance with the present technology, the location of the vehicle can be determined accurately even when the vehicle is at a great distance from the camera. Thus, the present technology provides improved approaches for determinations of location and distance by infrastructure based perception systems. These and other inventive features and related advantages of the various embodiments of the present technology are discussed in more detail herein.

FIG. 1 illustrates an example system 100 including an on road detection module 102, according to some embodiments of the present technology. The on road detection module 102 can provide support for various functions of an autonomous system of navigation of any type of vehicle (or ego vehicle), such as a passenger car or a truck. The on road detection module 102 can generate perception data 114. The perception data 114 can include, for example, locations of objects detected in an environment. The on road detection module 102 can support a planning function of an autonomous system of a vehicle, such as a prediction and planning module 616 of an autonomous system 610 of FIG. 6, as discussed in more detail below. Alternatively or additionally, the on road detection module 102 can support a control function of an autonomous system of a vehicle, such as a control module 618 of the autonomous system 610 of FIG. 6, as discussed in more detail below. The on road detection module 102 can generate the perception data 114 based on various data, such as sensor data 104 and map data 106, which are discussed in more detail herein.

In some embodiments, some or all of the functionality performed by the on road detection module 102 may be performed by one or more computing systems implemented in an infrastructure based perception system (e.g., camera, camera system, etc.) that is located or disposed on, along, or adjacent to a road or other transportation related infrastructure. In some embodiments, some or all of the functionality performed by the on road detection module 102 may be performed by one or more backend computing systems (e.g., remote from a vehicle). In some embodiments, some or all of the functionality performed by the on road detection module 102 may be performed by a computing system of a vehicle in communication with an infrastructure based perception system. In some embodiments, some or all data processed and/or stored by the on road detection module 102 can be stored in a data store (e.g., local to the on road detection module 102) or other storage system (e.g., cloud storage or vehicle storage remote from on road detection module 102). The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the on road detection module 102 can be implemented in any suitable combinations. Functionalities of the on road detection module 102 or variations thereof may be further discussed herein or shown in other figures.

As referenced or suggested herein, autonomous vehicles can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, based on the SAE standard, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

The on road detection module 102 can include a marker detection module 108. The marker detection module 108 can detect specially designed markers captured in sensor data. The markers can facilitate accurate location estimations of objects on or around the road. In various embodiments, the present technology provides for placement of specially designed markers on or around a road. The markers can be placed at various places, such as on the road, on a divider of the road, on edges of the road, at a predetermined distance from the road, etc. The markers can be placed according to various patterns according to different orientations and different spacing, for example, at predetermined distances (e.g., 1 meter, 5 meters, 10 meters) from each other, at increasing distances from each other as distances from the markers to a sensor increase, and at distances and configurations specified by a predetermined pattern. For example, a predetermined pattern can specify that markers be spaced a first distance (e.g., 2 meters) apart laterally and a second distance (e.g., 10 meters) apart longitudinally on a road.

The markers can be various shapes and forms to distinguish the markers from other objects on or around the road. For example, the markers can include visual indicators painted on or around the road, such as solid lines, dashed lines, designs, symbols, marks, signs, and characters. The markers on the road can function as lane markers on the road or interweave with lane markers on the road. The markers can be disposed on or with structures on or around the road, such as poles, cones, barriers, walls, fences, and dividers. The markers can include various features to distinguish the markers from the objects on or around the road. For example, the markers can include colors, designs, and markings that are distinct from common road signs and lane markings. The markers can include reflective features and light emitting features. For example, the markers can include constant light sources, colored light sources, pulsing light sources, and patterned light sources. The light emitting features on the markers can turn off and on based on visibility of the markers. For example, the light emitting features of a marker can turn on at night when visibility of the marker is lower and turn off during the day when visibility of the marker is higher. The light emitting features of the marker can turn on when weather reduces visibility of the marker. In some cases, markers on or around a road can have different shapes, forms, and features to distinguish the markers from each other. For example, a marker to facilitate a determination of longitudinal location can be a first shape or reflect first features (e.g., a first light pattern), while a marker to facilitate a determination of lateral location can be a second shape or reflect second features (e.g., a second light pattern). In some cases, markers on or around a road can have shapes, forms, features, and locations based on capabilities of sensors for capturing or detecting the markers. For example, the markers can have increasing size the farther the markers are from sensors so that the markers that are farther away are readily visible and detectable by the sensors. The markers can be located at increasing distances away from each other the farther the markers are from the sensors so that the markers that are farther away are readily distinguishable from each other by the sensors. The markers that are farther away can have additional distinguishing features to make the markers more visible to the sensors.

In some cases, information describing the markers can be stored in a map or database associated with the road. The information can include, for example, shapes, forms, and features of the markers. The information also can include, for example, locations of the markers, such as global locations (e.g., global coordinates, absolute coordinates) and relative locations with respect to a sensor. The information can include, for example, patterns associated with the markers along with a particular configuration of markers and distances between markers for each pattern. Based on the information maintained in the map or the database, the locations of the markers detected in sensor data can be accurately and confidently known rather than estimated based on the sensor data.

The marker detection module 108 can detect markers in sensor data captured in or at an environment and determine locations of the markers in the environment. The locations of the markers can be determined based on a map or a database that indicates the locations of the markers in the environment. The markers can be detected based on suitable computer vision or machine learning techniques. For example, a machine learning model can be trained to detect markers in sensor data based on training data that includes instances of sensor data that include markers in various conditions. The conditions can include, for example, various times of day (e.g., daytime, nighttime), different weather conditions (e.g., rainy conditions, cloudy conditions, sunny conditions), different roads (e.g., one way road, two way road, single lane road, multiple lane road), different road conditions (e.g., light traffic, heavy traffic, various lane markings, merging lanes, accidents), and the like. The instances of sensor data can include markers, for example, unobstructed or partially obstructed by various objects, such as vehicles, pedestrians, and debris. The sensor data can be labeled to identify markers in the sensor data. The sensor data can be annotated to indicate locations (e.g., xy coordinates, bounding boxes) or pixel positions of markers in the sensor data. Based on the training data, the machine learning model can be trained to detect markers in sensor data and determine locations of the markers in the sensor data. The markers detected in the sensor data can be correlated with known markers in a map or a database. The map or the database can include information describing the markers (e.g., shapes, forms, features, global locations of the markers), relative locations of the markers to a sensor, patterns associated with the markers, and predetermined distances between the markers. By correlating the markers detected in the sensor data with the known markers in the map or the database, the locations of the markers in the environment can be accurately determined without the need to estimate the locations of the markers in the environment.

For example, a road can include a set of markers, such as solid rectangle markers, positioned longitudinally and laterally across the road at predetermined distances. In this example, the set of markers can be positioned a first distance (e.g., 3 meters) apart longitudinally and a second distance (e.g., 5 meters) apart laterally. A camera on the road can capture an image of the road. The set of markers can be detected in the image. For example, a machine learning model trained based on instances of images depicting markers can detect the set of markers in the image. The set of markers can be correlated with a database that includes information describing the set of markers. The locations on the road of the set of markers can be determined based on the information. For example, the information can specify that the markers are positioned the first distance apart longitudinally and the second distance apart laterally. Based on the information that the markers are positioned the first distance apart longitudinally and the second distance apart laterally, a first location on the road of a first marker in the set of markers can be determined by estimating a second location of a second marker that is closer to the camera than the first marker and determining the first location of the first marker based on the second location. As another example, the information can include a location on the road for every marker in the set of markers. Many variations are possible.

In some cases, sensors can be calibrated based on markers. The sensors can capture sensor data of an environment that includes the markers. Locations of the markers in the environment can be estimated. The estimated locations of the markers in the environment can be compared with known locations of the markers in the environment from a map or a database associated with the environment. The sensors can be calibrated to minimize an error or a difference between the estimated locations and the known locations. For example, a stereo camera pair can capture a first camera image of a marker in an environment and a second camera image of the marker in the environment. An estimated location of the marker in the environment can be estimated based on a difference between a first position of the marker in the first camera image and a second position of the marker in the second camera image. In this example, the marker can be estimated to be a first distance (e.g., 505 meters) away from the stereo camera pair based on the difference between the first position of the marker and the second position of the marker. The estimated location of the marker in the environment can be compared with a known location of the marker in the environment from a map or a database associated with the environment. In this example, the known location of the marker in the environment can be a second distance (e.g., 500 meters) away from the stereo camera pair. The stereo camera pair can be calibrated to minimize an error between the estimated location and the known location. In this example, an offset or delta (e.g., 5 meters) can be applied to locations in the environment estimated based on the stereo camera pair or the stereo camera pair can be adjusted so the estimated location of the marker in the environment based on differences in camera images of the marker is the second distance (e.g., 500 meters) away from the stereo camera pair. Many variations are possible.

The on road detection module 102 can include an object detection module 110. The object detection module 110 can detect objects captured in sensor data. The objects can be detected based on various computer vision or machine learning techniques separately or in combination with the machine learning techniques described for detecting markers. For example, a machine learning model can be trained to detect objects based on sensor data. The machine learning model can be trained with training data that includes instances of sensor data that include various objects. The sensor data can include, for example, labels (e.g., class labels) that identify objects in the sensor data. The sensor data can be annotated to indicate locations (e.g., xy coordinates, bounding boxes) or pixel positions of objects in the sensor data. Based on the training data, the machine learning model can be trained to detect objects in sensor data. The machine learning model can be trained to identify the objects in the sensor data and label the objects to indicate, for example, classes of the objects. The machine learning model can be trained to generate, for example, bounding boxes to indicate locations of the objects in the sensor data.

In some cases, a machine learning model can be trained to detect objects in sensor data that is captured in an environment with markers on or around a road. The machine learning model can be trained to differentiate the objects in the sensor data from the markers on or around the road. Instances of sensor data that depict markers on or around the road can be selected as training data for training the machine learning model. The sensor data can include, for example, labels (e.g., class labels) that identify objects captured in the sensor data. The sensor data can include, for example, annotations (e.g., xy coordinates, bounding boxes) that indicate locations or pixel positions of the objects in the sensor data. Based on the training data, the machine learning model can be trained to detect objects in the presence of markers in sensor data captured at an environment. The machine learning model can generate, for example, labels (or inferences, classifications) to identify the objects in the sensor data. The machine leaning model can generate, for example, bounding boxes to indicate locations of the objects in the sensor data. In some cases, instances of labeled sensor data captured at an environment with markers on or around the road can be used to fine tune a trained machine learning model to improve detection of objects at the environment by the trained machine learning model. For example, the machine learning model can be trained to detect objects in sensor data in various environments. The machine learning model can be further trained, or fine tuned, based on the instances of labeled sensor data captured at the environment with the markers on or around the road. By fine tuning the machine learning model with instances of labeled sensor data captured at an environment with markers on or around a road, the accuracy of the machine learning model with respect to detecting objects can be improved with fewer instances of sensor data than would be required to train a machine learning model from scratch with the same type of sensor data.

In some cases, a machine learning model can be trained to identify key points of objects. The key points can include, for example, points on a substantially same plane as a marker (e.g., points of contact with a road), points with high visibility, and easily identifiable points. For example, key points on a vehicle can include points where tires of the vehicle contact the road; headlights, taillights, turn signals, reflective points, and other points of high visibility; and license plates and other easily identifiable points. The machine learning model can be trained based on training data that includes instances of sensor data. The sensor data can include, for example, labels (e.g., class labels) that identify key points of objects captured in the sensor data. The sensor data can include, for example, annotations (e.g., xy coordinates, bounding boxes) that indicate the locations of the key points of the objects in the sensor data. Based on the training data, the machine learning model can be trained to detect key points of objects in sensor data. The machine learning model can generate, for example, labels (or inferences, classifications) to identify the key points of the objects in the sensor data. The machine leaning model can generate, for example, bounding boxes to indicate locations of the key points of the objects in the sensor data.

One or more of the various computer vision or machine learning techniques described herein can be applied individually or in combination via one or more machine learning models. For example, a machine learning model can be trained and fine tuned to identify objects and key points of the objects based on training data that includes instances of sensor data captured with markers on or around a road. During inference or runtime, sensor data captured at an environment with markers on or around a road can be provided to the machine learning model. The machine learning model can detect objects in the sensor data and key points of the objects in the sensor data. The machine learning model can generate labels to identify the objects and the key points of the objects in the sensor data. The machine learning model can generate annotations to indicate locations of the objects and the key points of the objects in the sensor data. As another example, while separate functionality has been discussed to detect markers and to detect objects and associated key points, their detection can be combined. For instance, a machine learning model can be trained (and fine tuned) to detect markers and objects and associated key points. Many combinations and variations are possible.

The object detection module 110 can estimate dimensions (e.g., width, length, height) of objects captured in sensor data based on one or more markers detected in the sensor data. The dimensions of the objects can be estimated based on a variety of techniques. In some embodiments, the dimensions of the objects can be estimated based on dimensions of the one or more markers. An estimated height of the vehicle can be determined based on a known height of the marker. For example, an image of a road can depict a vehicle positioned laterally or offset relative to a marker (e.g., pole) as being the same height as the marker. In this example, the estimated height of the vehicle can be the known height of the marker. As another example, an image of a road can depict a vehicle positioned laterally relative to a marker (e.g., pole) as not being the same height as the marker. An estimated height of the vehicle can be determined based on a ratio of a height of the vehicle as depicted in the image to a height of the marker as depicted in the image. For instance, the height of the vehicle and the height of the marker as depicted in the image can be expressed or represented as an amount of pixels or other measure of distance in relation to the image. Based on the ratio and a known height of the marker, the estimated height of the vehicle can be determined. In this example, the estimated height of the vehicle can be the known height of the marker multiplied by the ratio. In some cases, dimensions of an object can be estimated based on geometric estimates. Known dimensions of markers can be scaled (e.g., linearly scaled) based on an estimated location of the object relative to the markers. The dimensions of the object can be geometrically estimated based on the scaled, known dimensions of the markers. For example, an image of a road can depict a vehicle near a marker whose dimensions are known. Dimensions of the vehicle can be estimated based on the known dimensions of the marker and an estimated location of the vehicle relative to the marker. In this example, the vehicle can be determined to be farther away from a camera that captured the image than the marker. The known dimensions of the marker can be scaled smaller based on the determined location of the vehicle and its distance from the marker. The dimensions of the vehicle can be estimated based on the scaled, known dimensions of the marker. In some embodiments, dimensions of an object can be estimated by determining the locations of reference points on the object. For example, the location of a reference point on a front portion of a vehicle and the location of a reference point on a rear portion of the vehicle can be determined based on one or more markers, as discussed in more detail herein. A dimension (e.g., length) of the vehicle can be determined based on a difference between the location of the reference point on the front portion of the vehicle and the location of the reference point on the rear portion of the vehicle. Many variations are possible.

The on road detection module 102 can include an object location module 112. The object location module 112 can determine a location or position in an environment for an object detected in sensor data captured at the environment based on one or more markers detected in the sensor data. The location of the object in the environment can be determined based on a location of the object in the sensor data relative (e.g., longitudinally, laterally) to one or more locations of the one or more markers in the sensor data. The location of the object in the sensor data can be indicated by an annotation of the object generated based on the sensor data. The one or more locations of the one or more markers in the sensor data can be indicated by one or more annotations of the one or more markers generated based on the sensor data. The location of the object relative to the one or more locations of the one or more markers in the sensor data can be determined based on the annotation of the object and the one or more annotations of the one or more markers. Based on the location of the object in the sensor data relative to the one or more locations of the one or more markers in the sensor data, one or more distances between the object and the one or more markers in the environment can be determined. For example, a distance between an object (or a portion or point thereof) and a marker can be based on a number of pixels between a first pixel of the object closest to the marker and a second pixel of the marker closest to the object. The distance can be based on a scale correlating distance with pixels for different markers. For example, a pixel for a marker farther from a sensor can be correlated with (or represent) a relatively larger distance than a pixel for a marker closer to the sensor. Based on the one or more distances between the object and the one or more markers in the environment, and one or more known locations in the environment of the one or more markers, the location of the object in the environment can be determined. The one or more known locations in the environment of the one or more markers can be based on information stored in a map or a database associated with the environment.

For example, a vehicle can navigate a road that includes a set of markers. The set of markers in this example can be poles positioned a predetermined distance (e.g., 10 meters) apart along an edge of the road. A camera on or near the road can capture an image of the road. The vehicle and a subset of the set of markers can be detected in the image. A first location (or position) of the vehicle in the image can be determined. A second location of a closest marker to the vehicle can be determined. Based on the first location relative to the second location, a distance between the vehicle and the closest marker to the vehicle can be determined. For example, the vehicle can be a first distance laterally and a second distance longitudinally away from the closest marker to the vehicle. A known location of the closest marker can be determined based on information in a map for the road. Based on the first distance and the second distance between the vehicle and the closest marker and the known location of the closest marker, a location of the vehicle on the road can be determined. Many variations are possible.

In some cases, a distance between an object and a marker can be determined based on a location of a point (or key point) of the object and a location of a component or a portion (e.g., an edge, an end, a corner, a feature, a point) of the marker. For example, a distance between a vehicle and a marker can be determined based on a location of a point where a tire of the vehicle contacts the ground and a location of an edge of the marker. As another example, a distance between a vehicle and a marker can be determined based on a location of a point of the vehicle and a location of a corner of the marker. In some cases, a distance estimation or a location estimation of an object can be determined based on a combination (e.g., average, weighted average) of distance estimations or location estimations. For example, a first location estimation of an object can be made with respect to a first marker. A second location estimation of the object can be made with respect to a second marker. A location estimation of the object can be made based on an average of the first location estimation and the second location estimation. Many variations are possible.

In some cases, a distance estimation or a location estimation of an object can be determined based on computer vision or machine learning techniques. For example, a computer vision model can estimate a location of an object based on image data that depicts the object and one or more markers. As another example, a machine learning model can be trained to provide a distance estimation or a location estimation for an object detected in sensor data. The machine learning model can be trained based on training data that includes instances of sensor data of environments that include objects on a road and markers on or around the road. The instances of training data can be labeled to indicate distances or locations of the objects on the road in relation to the markers. Based on the instances of training data, the machine learning model can be trained to determine a distance or a location of an object based on its location in sensor data relative to markers in the sensor data. For example, a machine learning model can be trained to determine a location of an object in an environment captured in image data based on training data that includes instances of image data of the environment. In this example, the environment can include a road with a set of markers on the road. The machine learning model can be trained to determine the location of the object based on a relative location of the object in the image data with respect to the set of markers in the image data.

In some cases, a distance estimation or a location estimation of an object in an environment can be constrained based on locations of markers in the environment. For example, a stereo camera pair can capture a first camera image of a vehicle in an environment and a second camera image of the vehicle in the environment. An estimated location in the environment can be determined based on a difference between a first position of the vehicle in the first camera image and a second position of the vehicle in the second camera image. The estimated location of the vehicle can be constrained based on markers closest to the vehicle. In this example, the vehicle can be estimated to be 653 meters away from the stereo camera pair based on the difference between the first position of the vehicle in the first camera image and the second position of the vehicle in the second camera image. Both the first camera image and the second camera image can depict the vehicle as being between a first marker that is 640 meters away from the stereo camera pair and a second marker that is 650 meters away from the stereo camera pair. Because the vehicle is depicted as between the first marker and the second marker, the estimated distance of the vehicle can be constrained to be at least 640 meters and at most 650 meters away from the stereo camera pair. As another example, the estimated location of the vehicle can be constrained to be between a first location (e.g., xy coordinates) of the first marker and a second location (e.g., xy coordinates) of the second marker. Many variations are possible.

In some cases, the on road detection module 102 can determine a velocity or an acceleration of an object based on locations of the object in an environment at different times. The velocity of the object can be determined based on a difference between locations of the object in the environment over a period of time. The acceleration of the object can be determined based on a difference between velocities of the object in the environment over a period of time. For example, locations of a vehicle travelling through an environment can be determined over a period of time. A first velocity of the vehicle can be determined based on a difference between a first location of the vehicle in the environment at a first time and a second location of the vehicle in the environment at a second time. A second velocity of the vehicle can be determined based on a difference between the second location of the vehicle in the environment at the second time and a third location of the vehicle in the environment at a third time. An acceleration of the vehicle likewise can be determined based on a difference between a first velocity of the vehicle at a first time and a second velocity of the vehicle at a second time.

In some cases, the on road detection module 102 can communicate a location of an object in an environment through an infrastructure based perception system to facilitate localization of the object with respect to a map. For example, an infrastructure based perception system can maintain a global map of an environment and localize objects (e.g., vehicles) on the global map as the objects travel through the environment. Information related to localization of the object, such as locations of the objects, velocities of the objects, and accelerations of the objects, can be communicated to the objects through the infrastructure based perception system. In some cases, an infrastructure based perception system can use markers to facilitate hand offs between sensors and maintain detection continuity across the sensors. For example, as a vehicle travels through an environment, various sensors of an infrastructure based perception system can capture sensor data of the vehicle in the environment. The environment can include markers that are captured in the sensor data. The infrastructure based perception system can use the markers as reference points as the vehicle travels across ranges of the various sensors. As the vehicle leaves a first range of a first sensor and enters a second range of a second sensor, a location of the vehicle relative to a marker can be communicated from the first sensor to the second sensor through the infrastructure based perception system. The second sensor can identify the vehicle that left the first range of the first sensor based on, for example, the location of the vehicle relative to the marker, the velocity of the vehicle, or the acceleration of the vehicle. Many variations are possible. While the determination of the location of an ego vehicle is discussed in many examples set forth herein for purposes of illustration, the present technology can apply to the determination of location of any type of object, such as another vehicle, a bicycle, a pedestrian, an animal, an accident scene, a road hazard, road debris, road damage, etc.

Figure 2:
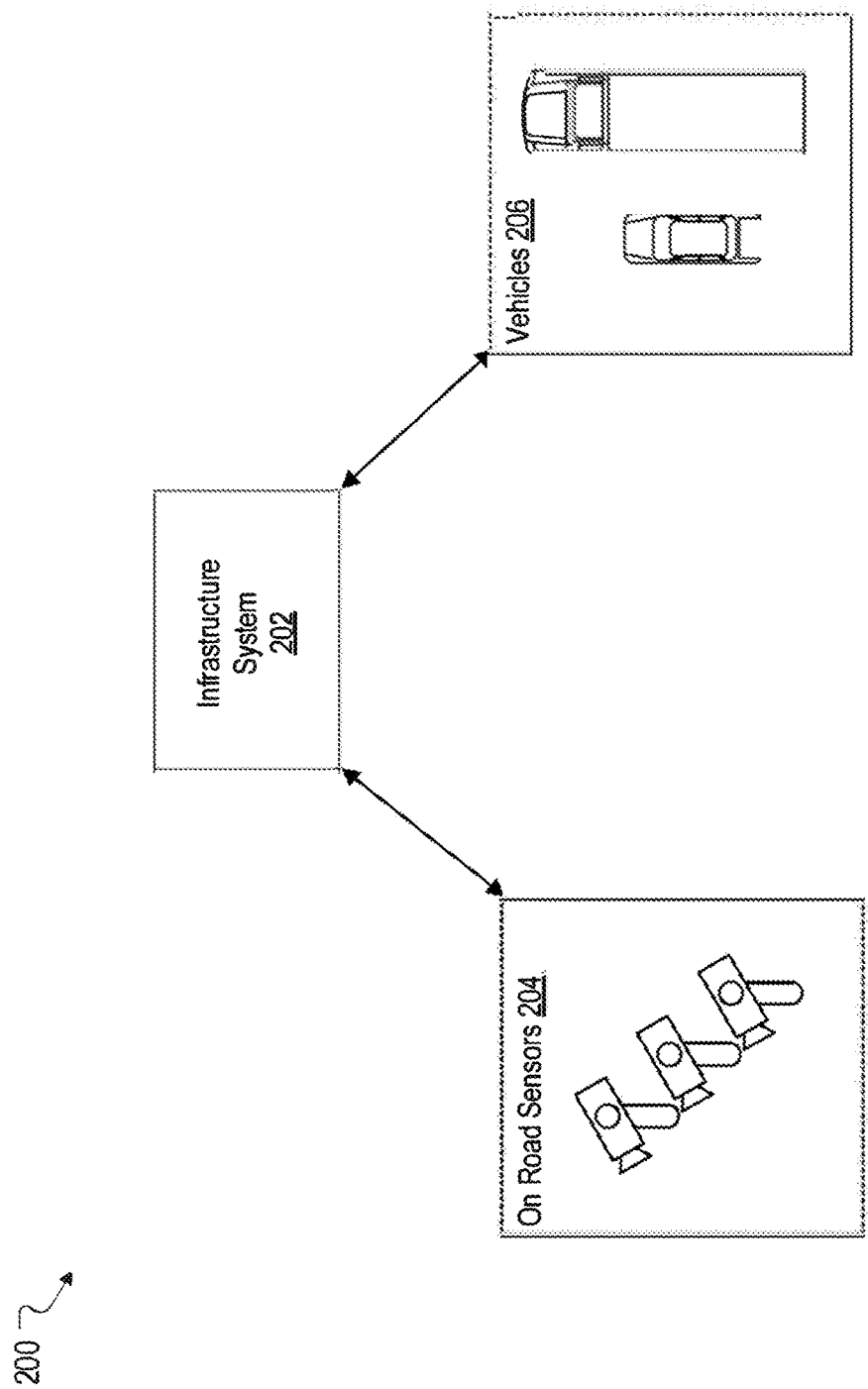
FIG. 2 illustrates an example block diagram associated with an infrastructure based perception system, according to embodiments of the present technology.

FIG. 2 illustrates an example block diagram 200 associated with an infrastructure based perception system, according to some embodiments of the present technology. The various functionality described herein can be performed by, for example, the on road detection module 102 of FIG. 1. It should be understood that there can be additional, fewer, or alternative blocks, functionality, or steps performed in similar or alternative orders, or in parallel, based on the various features and embodiments discussed herein unless otherwise stated.

As illustrated in FIG. 2, an infrastructure based perception system can include an infrastructure system 202, on road sensors 204, and vehicles 206. The on road sensors 204 can capture sensor data of an environment. The environment can include, for example, the vehicles 206 and markers on or around roads in the environment. The on road sensors 204 can provide the sensor data to the infrastructure system 202. The infrastructure system 202 can determine locations of the vehicles 206 in the environment based on the sensor data. For example, the infrastructure system 202 can use a database of information that includes known locations of the markers to localize the vehicles 206 on a global map of the environment. The infrastructure system 202 can communicate localization information of the vehicles 206 to the vehicles 206. The vehicles 206 can, for example, use the localization information to navigate the environment. For example, the vehicles 206 can navigate to avoid objects and otherwise optimize route planning based on the localization information of the objects. In some cases, the vehicles 206 can provide data, such as sensor data captured by autonomous systems of the vehicles 206, location data, speed data, and route data to the infrastructure system 202. The data can be shared among the vehicles 206 via the infrastructure system 202 to facilitate safe navigation by the vehicles 206 through the environment. In some cases, the infrastructure system 202 can provide data, such as identification data of the vehicles 206 to the on road sensors 204. The on road sensors 204 can use the identification data to maintain continuity of sensor data with respect to the vehicles 206 as the vehicles 206 travel through the environment and across the ranges of different sensors. In some cases, the infrastructure system 202 can communicate localization information of the vehicles 206 to other entities (e.g., public safety authorities, governmental bodies, members of the public, etc.), apart from the vehicles 206, to apprise the entities of real time road conditions of the environment. Many variations are possible.

Figure 3A:
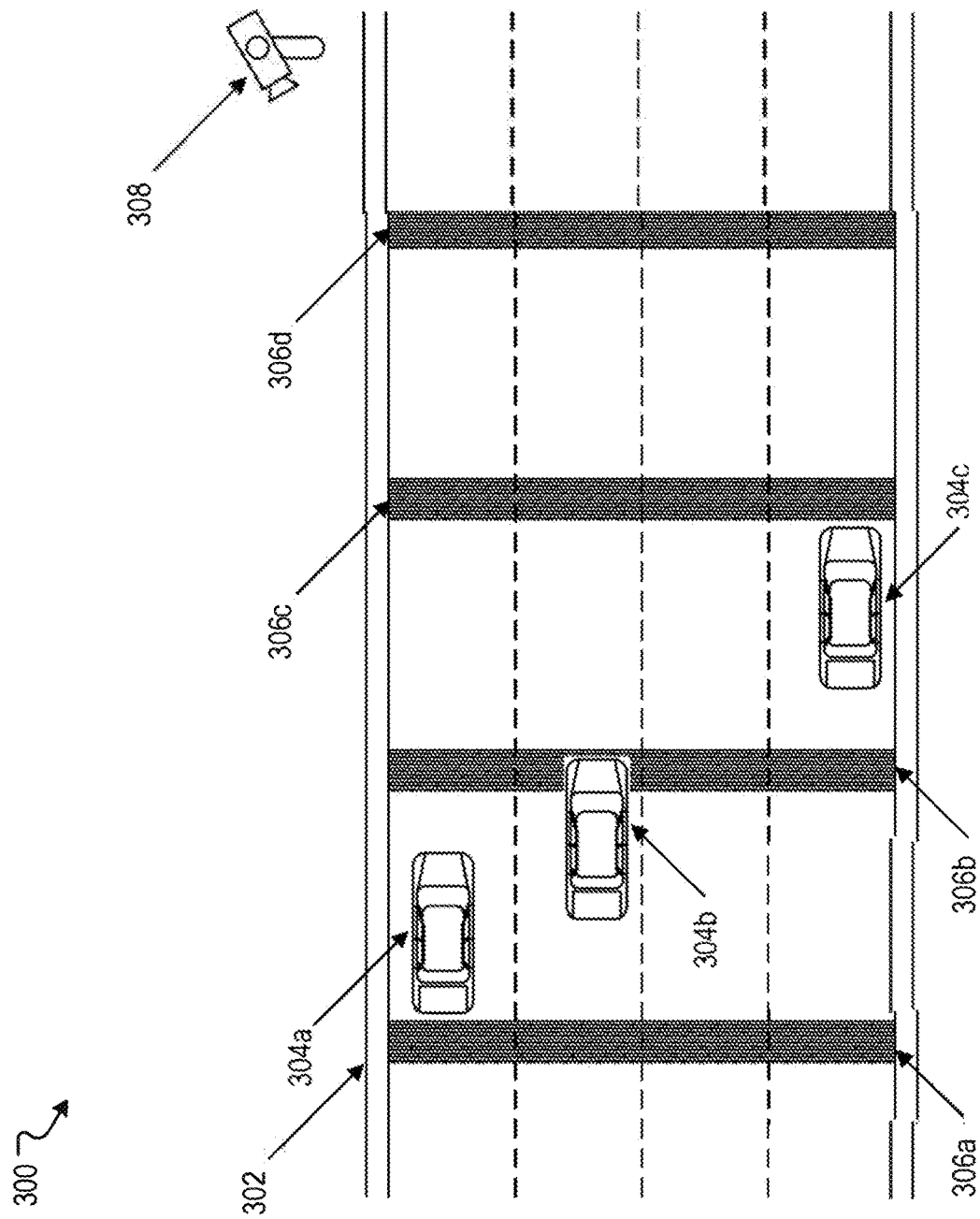
FIGS. 3A-3C illustrate examples associated with improved detection of road objects using perception markers, according to embodiments of the present technology.
Figure 3B:
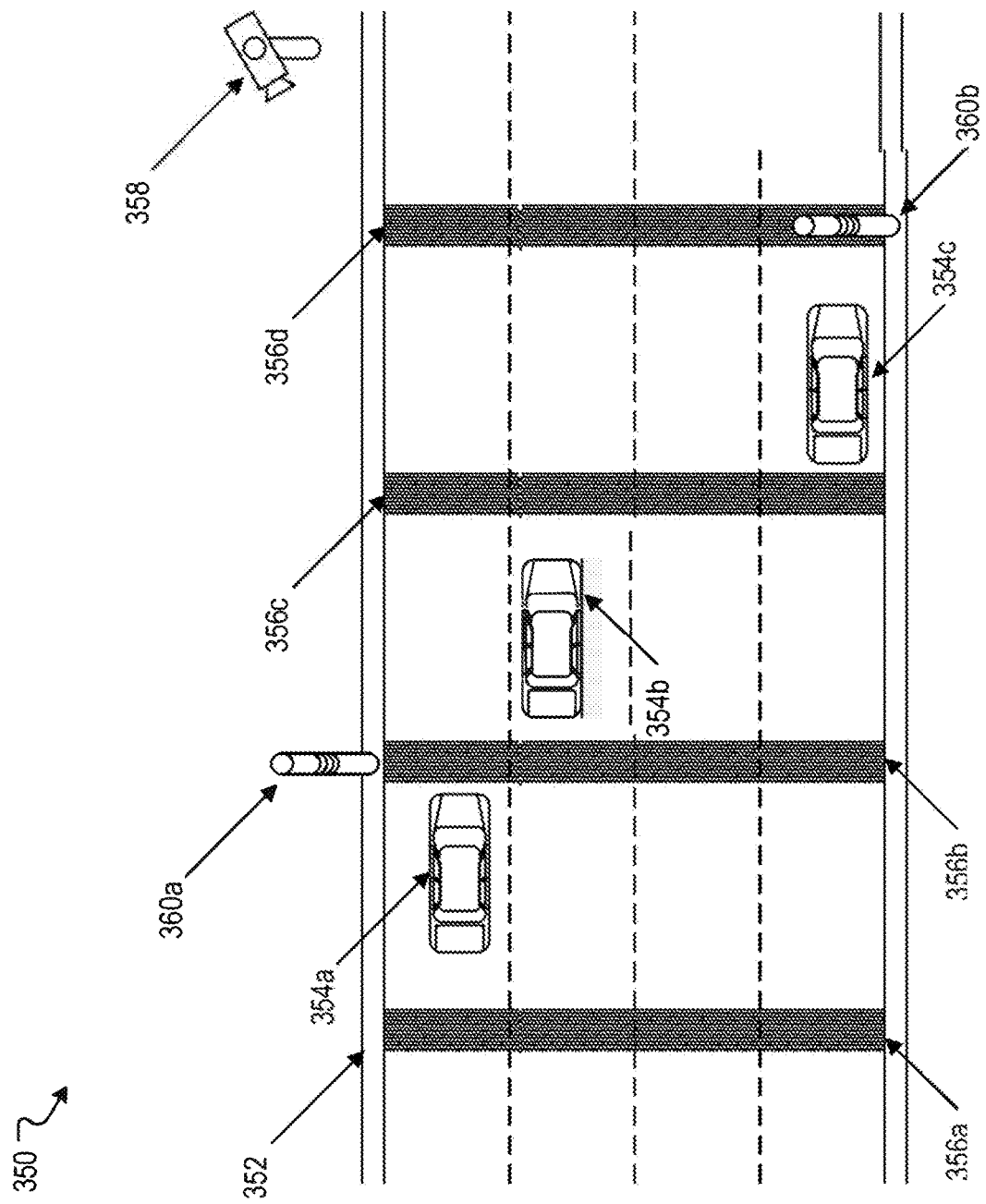
Figure 3C:
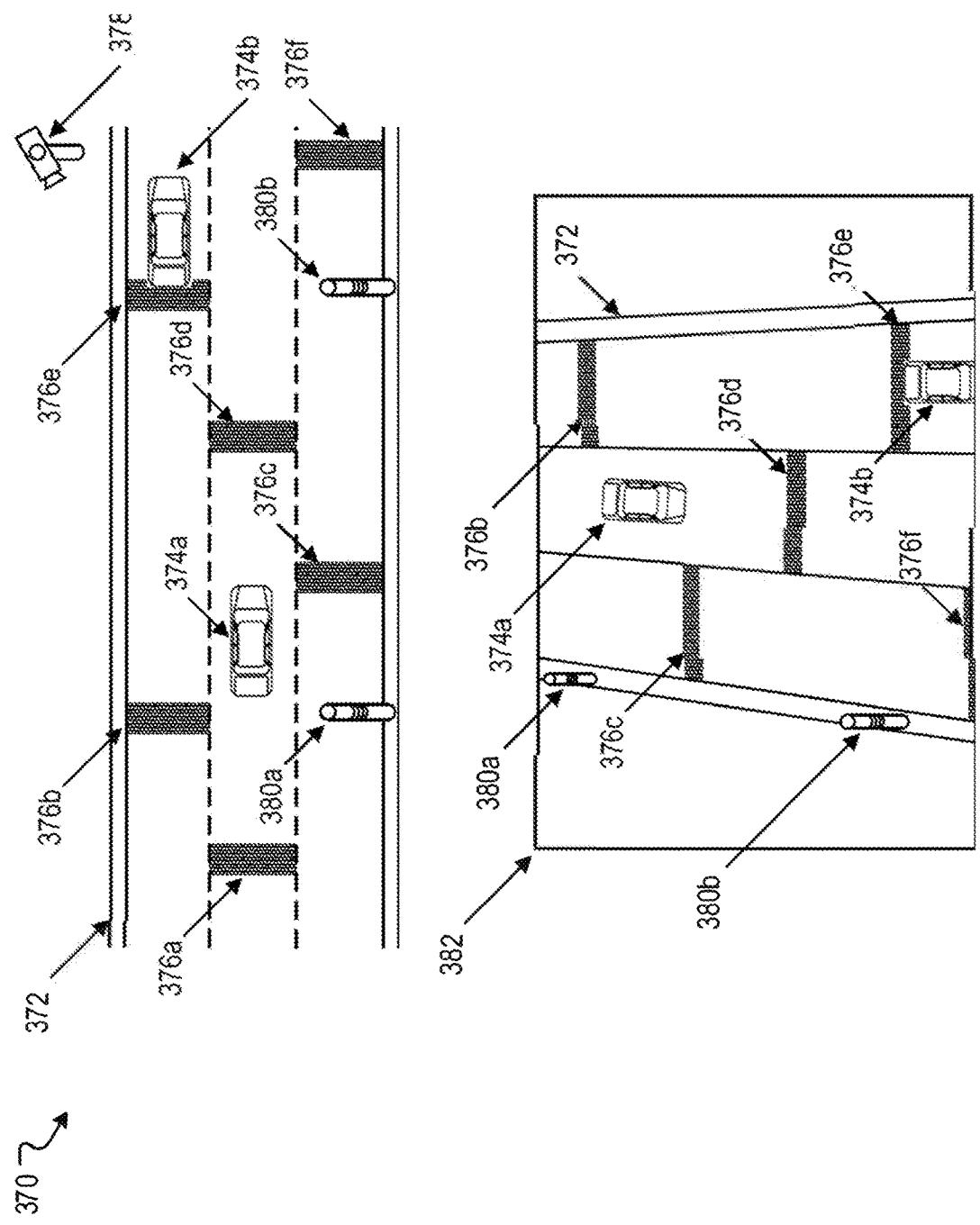

FIGS. 3A-3C illustrate examples associated with improved detection using perception markers, according to some embodiments of the present technology. The various functionality described herein can be performed by, for example, the on road detection module 102 of FIG. 1. It should be understood that there can be additional, fewer, or alternative functionality or steps performed in similar or alternative orders, or in parallel, based on the various features and embodiments discussed herein unless otherwise stated.

As illustrated in FIG. 3A, example 300 includes vehicles 304a, 304b, 304c travelling on a road 302 with markers 306a, 306b, 306c, 306d. A sensor 308 can detect the vehicles 304a, 304b, 304c as the vehicles 304a, 304b, 304c travel on the road 302. In this example, a first location of the first vehicle 304a can be determined based on the markers 306a, 306b. A second location of the second vehicle 304b can be determined based on the marker 306b. A third location of the third vehicle 304c can be determined based on the markers 306b, 306c. A location of a vehicle can be determined in various manners with respect to one or more reference points of a vehicle or a bounding box of the vehicle that is generated in detection of the vehicle. For example, for the first vehicle 304a, a first relative location of the first vehicle 304a with respect to the marker 306a can be determined based on a distance between a reference point on a rear portion of the first vehicle 304a and an edge (e.g., most adjacent lateral edge) of the marker 306a. A second relative location of the first vehicle 304a with respect to the marker 306b can be determined based on a distance between a reference point on a front portion of the first vehicle 304a and an edge of the marker 306b. Locations and dimensions of the markers 306a, 306b on the road 302 can be stored in a map associated with the road 302. The first location of the first vehicle 304a on the road 302 can be determined based on the first relative location, the second relative location, and the locations and the dimensions of the markers 306a, 306b. For instance, the relative locations of the first vehicle can be transformed to global (or absolute) locations, and the global locations can be combined in a suitable technique (e.g., averaged) to determine the first location of the first vehicle 304a. Many variations are possible. The second location of the second vehicle 304b can be determined based on a location of the marker 306b since the second vehicle 304b is on top of the marker 306b. A distance between a reference point on a front portion of the second vehicle 304b and an edge of the marker 306b can be determined. A location and dimensions of the marker 306b on the road 302 can be stored in the map associated with the road 302. The second location of the second vehicle 304b can be determined based on the location and the dimensions of the marker 306b on the road 302 and the distance between the reference point on the front portion of the second vehicle 304b and the edge of the marker 306b. For the third vehicle 304c, a first relative location of the third vehicle 304c with respect to the marker 306b can be determined based on a distance between a reference point on a rear portion of the third vehicle 304c and an edge of the marker 306b. A second relative location of the third vehicle 304c with respect to the marker 306c can be determined based on a distance between a reference point on a front portion of the third vehicle 304c and an edge of the marker 306c. Locations and dimensions of the markers 306b, 306c on the road 302 can be stored in the map associated with the road 302. The third location of the third vehicle 304a on the road 302 can be determined based on the first relative location, the second relative location, and the locations and the dimensions of the markers 306b, 306c. As illustrated in this example, the locations of the vehicles 304a, 304b, 304c can be determined without distance estimation of the vehicles 304a, 304b, 304c in relation to the sensor 308. Many variations are possible.

As illustrated in FIG. 3B, example 350 includes vehicles 354a, 354b, 354c travelling on a road 352 with markers 356a, 356b, 356c, 356d, 360a, 360b. In this example, the markers 356a, 356b, 356c, 356d can be solid rectangular markers on the road 352. The markers 360a, 360b can be poles on a side of the road 352. A sensor 358 can detect the vehicles 354a, 354b, 354c as the vehicles 354a, 354b, 354c travel on the road 352. In this example, a first location of the first vehicle 354a can be determined based on the markers 356a, 356b, 360a. A second location of the second vehicle 354b can be determined based on the markers 356b, 356c, 360a. A third location of the third vehicle 354c can be determined based on the markers 356c, 356d, 360b. For example, for the first vehicle 354a, a first relative location of the first vehicle 354a with respect to the marker 356a can be determined based on a distance between a reference point on a rear portion of the first vehicle 354a and an edge of the marker 356a. A second relative location of the first vehicle 354a with respect to the marker 356b can be determined based on a distance between a reference point on a front portion of the first vehicle 354a and an edge of the marker 356b. A third relative location of the first vehicle 354a with respect to the marker 360a can be determined based on a distance between a reference point on a front left portion of the first vehicle 354a and a portion (e.g., most adjacent end) of the marker 360a. Locations and dimensions of the markers 356a, 356b, 360a on the road 352 can be stored in a database associated with the road 352. The first location of the first vehicle 354a on the road 352 can be determined based on the first relative location, the second relative location, the third relative location, and the locations of the markers 356a, 356b, 360a. For the second vehicle 354b, a first relative location of the second vehicle 354b with respect to the marker 356b can be determined based on a distance between a reference point on a rear portion of the second vehicle 354b and an edge of the marker 356b. A second relative location of the second vehicle 354a with respect to the marker 356c can be determined based on a distance between a reference point on a front portion of the second vehicle 354b and an edge of the marker 356c. A third relative location of the second vehicle 354b with respect to the marker 360a can be determined based on a distance between a reference point on a rear left portion of the second vehicle 354b and a portion of the marker 360a. Locations and dimensions of the markers 356b, 356c, 360a on the road 352 can be stored in the database associated with the road 352. The second location of the second vehicle 354b on the road 352 can be determined based on the first relative location, the second relative location, the third relative location, and the locations and the dimensions of the markers 356b, 356c, 360a. For the third vehicle 354c, a first relative location of the third vehicle 354b with respect to the marker 356c can be determined based on a distance between a reference point on a rear portion of the third vehicle 354c and an edge of the marker 356c. A second relative location of the third vehicle 354c with respect to the marker 356d can be determined based on a distance between a reference point on a front portion of the third vehicle 354c and an edge of the marker 356d. A third relative location of the third vehicle 354c with respect to the marker 360b can be determined based on a distance between a reference point on a front right portion of the third vehicle 354c and a portion of the marker 360b. Locations and dimensions of the markers 356c, 356d, 360b on the road 352 can be stored in the database associated with the road 352. The third location of the third vehicle 354c on the road 352 can be determined based on the first relative location, the second relative location, the third relative location, and the locations and the dimensions of the markers 356c, 356d, 360b. As illustrated in this example, the locations of the vehicles 354a, 354b, 354c can be determined without distance estimation of the vehicles 354a, 354b, 354c in relation to the sensor 358. Further, as placement and incorporation of additional markers of different types on roads can be relatively cost efficient, utilization of a relatively larger number of markers of different types in determination of objects, as shown in this example, can improve the accuracy of such determinations. Many variations are possible.

As illustrated in FIG. 3C, example 370 includes vehicles 374a, 374b travelling on a road 372 with markers 376a, 376b, 376c, 376d, 376e, 376f, 380a, 380b. In this example, the markers 376a, 376b, 376c, 376d, 376e, 376f can be lane-width solid rectangular markers on the road 372. The markers 380a, 380b can be poles on a side of the road 372. Example 370 is an illustration, and other types, shapes, configurations, and patterns of markers are possible. A sensor 378 can detect the vehicles 374a, 374b as the vehicles 374a, 374b travel on the road 372. The location of the first vehicle 374a and the location of the second vehicle 374b can be determined based on one or any suitable number or combination of the markers 376a, 376b, 376c, 376d, 376e, 376f, 380a, 380b. In some embodiments, when a relatively larger number of the markers 376a, 376b, 376c, 376d, 376e, 376f, 380a, 380b are used to determine the location of one of the vehicles 374a, 374b, the determined location can be relatively more accurate compared to a determination of location based on a smaller number of the markers 376a, 376b, 376c, 376d, 376e, 376f, 380a, 380b. In some embodiments, a relatively smaller number of the markers 376a, 376b, 376c, 376d, 376e, 376f, 380a, 380b can be used to determine the location of one of the vehicles 374a, 374b. For example, a relatively small, selected number (e.g., 1, 2, 3, etc.) of the markers 376a, 376b, 376c, 376d, 376e, 376f, 380a, 380b can be used to determinate vehicle location when the selected number of markers are in closest proximity to the vehicle.

As illustrated in FIG. 3C, an example camera image 382 shows example image data captured by the sensor 378. As illustrated in the example camera image 382, the sensor 378 can detect the markers 376b, 376c, 376d, 376e, 376f, 380a, 380b and the vehicles 374a, 374b as the vehicles 374a, 374b travel on the road 372. The first location of the first vehicle 374a and the second location of the second vehicle 374b can be determined based on the markers 376b, 376c, 376e, 380a detected in the camera image 382. In this example, a first location of the first vehicle 374a can be determined based on the markers 376b, 376c, 380a. In this example, a second location of the second vehicle 374b can be determined based on the marker 376e. For example, for the first vehicle 374a, a first relative location of the first vehicle 374a with respect to the marker 376b can be determined based on a distance between a reference point on a rear portion of the first vehicle 354a and an edge of the marker 376b. A second relative location of the first vehicle 374a with respect to the marker 376c can be determined based on a distance between a reference point on a front portion of the first vehicle 376a and an edge of the marker 376c. A third relative location of the first vehicle 374a with respect to the marker 380a can be determined based on a distance between a reference point on a rear left portion of the first vehicle 374a and a portion (e.g., most adjacent end) of the marker 380a. Locations and dimensions of the markers 376b, 376c, 380a can be stored in a database associated with the road 372. The first location of the first vehicle 374a on the road 372 can be determined based on the first relative location, the second relative location, the third relative location, and the locations of the markers 376b, 376c, 380a. For the second vehicle 374b, a relative location of the second vehicle 374b and an edge of the marker 376e can be determined based on a distance between a reference point on a rear portion of the second vehicle 374b and an edge of the marker 376e. Location and dimensions of the marker 376e can be stored in the database associated with the road 372. The second location of the vehicle 374b on the road 372 can be determined based on the relative location and the location of the marker 376e. As indicated, the foregoing are illustrations. Other markers or combinations of markers can be used to determine the locations of the first vehicle 374a and the second vehicle 374b. Many variations are possible.

Figure 4A:
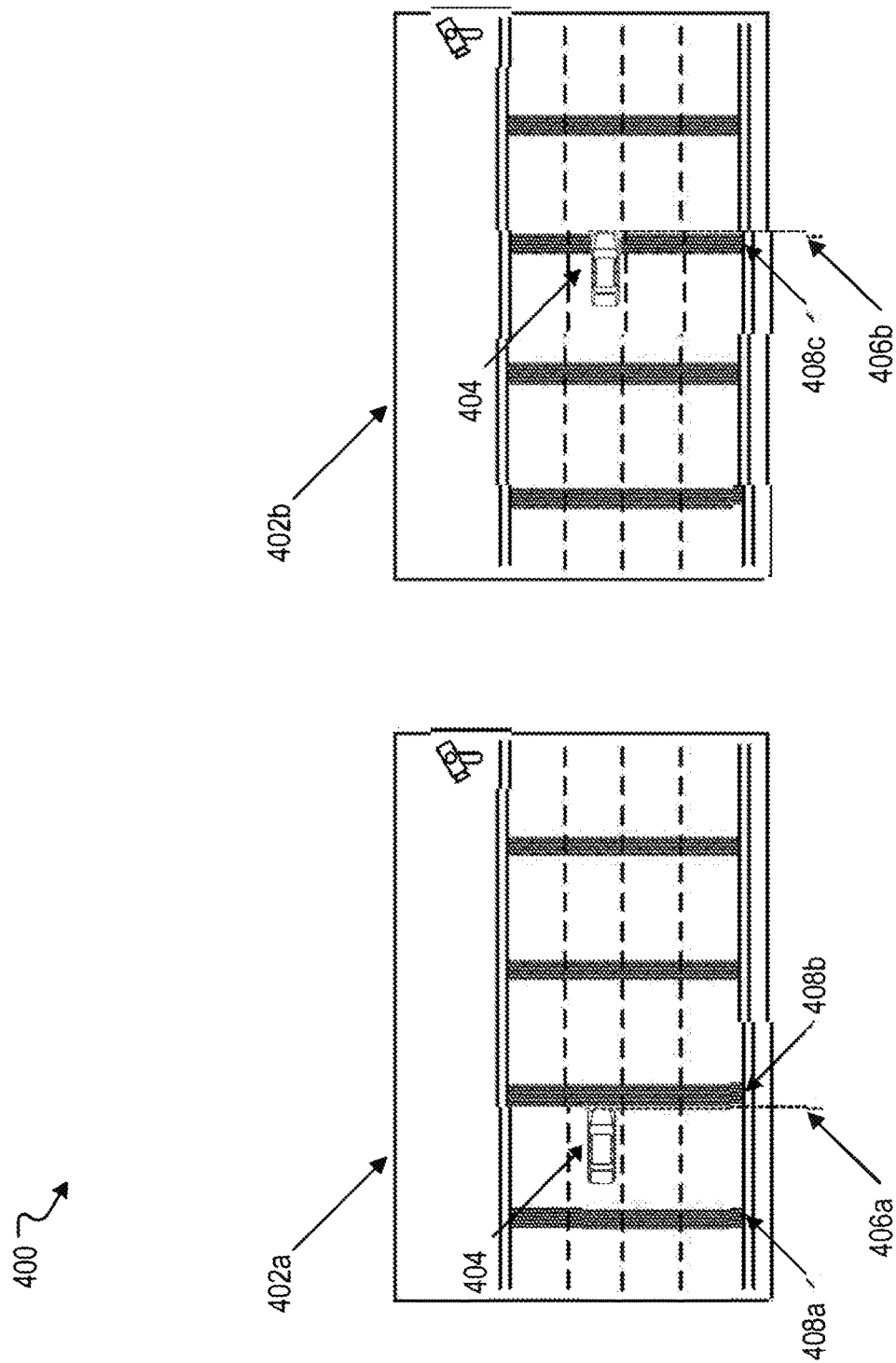
FIGS. 4A-4B illustrate examples associated with improved detection of road objects using perception markers, according to embodiments of the present technology.
Figure 4B:
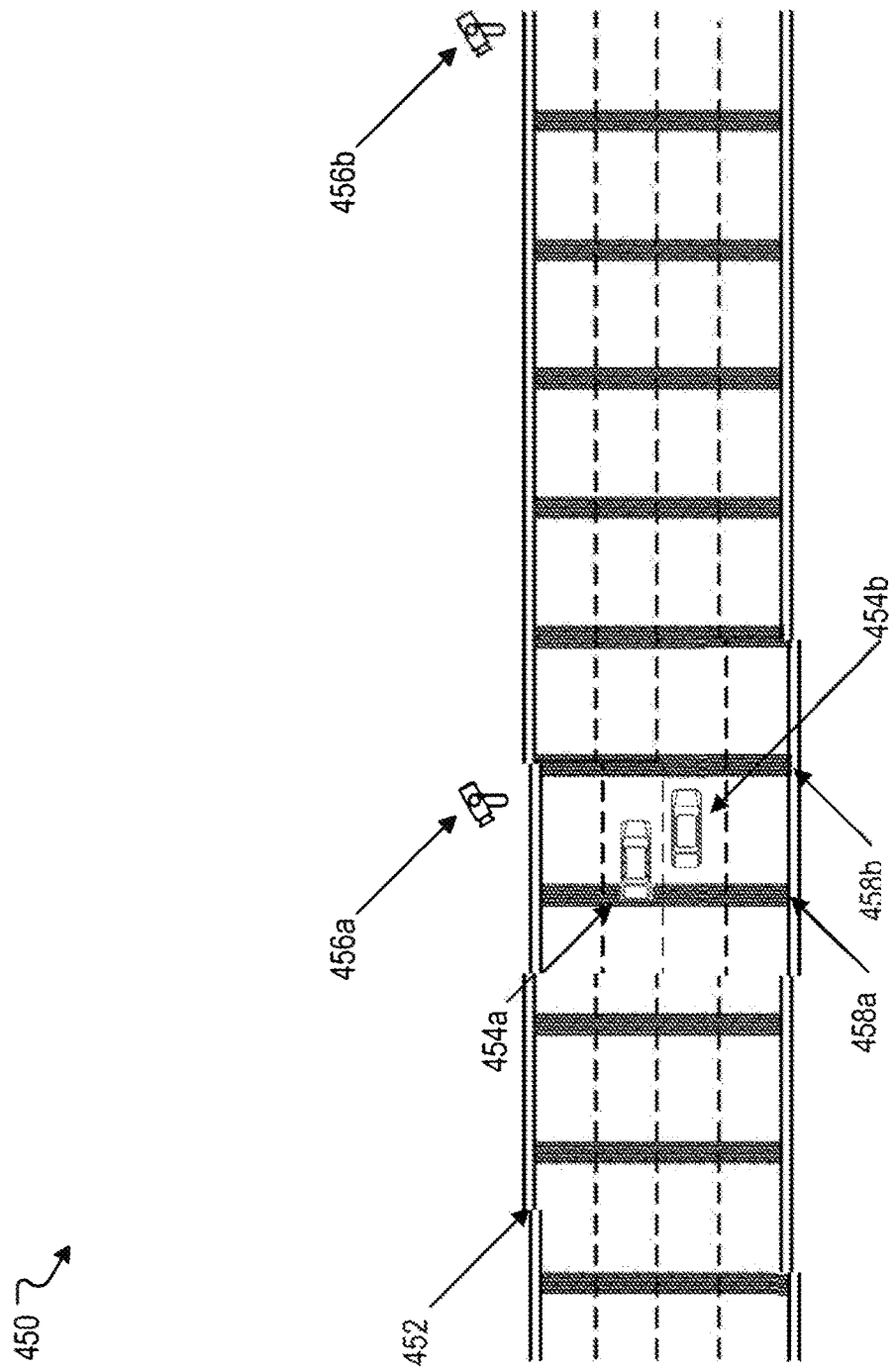

FIGS. 4A-4B illustrate examples associated with improved detection using perception markers, according to some embodiments of the present technology. The various functionality described herein can be performed by, for example, the on road detection module 102 of FIG. 1. It should be understood that there can be additional, fewer, or alternative blocks, functionality, or steps performed in similar or alternative orders, or in parallel, based on the various features and embodiments discussed herein unless otherwise stated.

As illustrated in FIG. 4A, example 400 includes a vehicle 404 at a first time 402a and a second time 402b. At the first time 402a, a first location 406a of the vehicle 404 can be determined based on a first relative location of the vehicle 404 with respect to marker 408a, a second relative location of the vehicle 404 with respect to marker 408b, and locations of the markers 408a, 408b. At the second time 402b, a second location 406b of the vehicle 404 can be determined based on a location of the marker 408c. In this example, a velocity of the vehicle 404 can be determined based on a difference between the first location 406a and the first location 406b over a period of time between the first time 402a and the second time 402b. As illustrated in this example, a velocity of the vehicle 404 can be determined without distance estimation of the vehicle 404. Many variations are possible.

As illustrated in FIG. 4B, example 450 includes vehicles 454a, 454b travelling on a road 452. The road 452 includes a set of markers including a first marker 458a and a second marker 458b. A first sensor 456a and a second sensor 456b can detect the vehicles 454a, 454b as the vehicles 454a, 454b travel on the road 452. In this example, the first vehicle 454a can be identified based on its relative location to the first marker 458a. The second vehicle 454b can be identified based on its relative location to the second marker 458b. As the vehicles 454a, 454b travel out of range of the first sensor 456a and into range of the second sensor 456b, detection continuity from the sensor 456a to the sensor 456b with respect to the vehicles 454a, 454b can be maintained based on identifications of the vehicles 454a, 454b and their location, velocity, and acceleration. As illustrated in this example, markers on or around a road can facilitate hand offs between sensors of an infrastructure based perception system. Many variations are possible.

Figure 5:
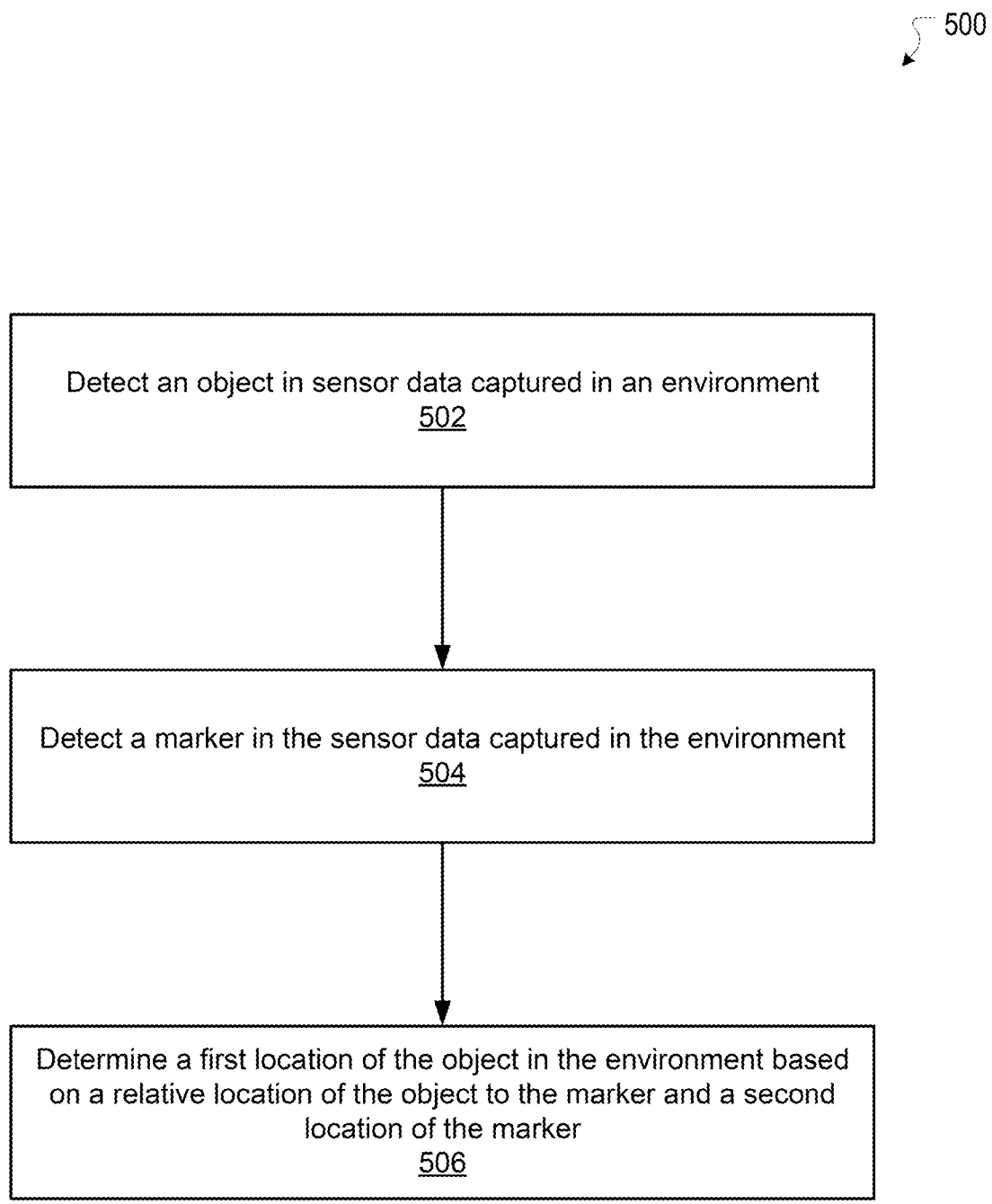
FIG. 5 illustrates an example method, according to embodiments of the present technology.

FIG. 5 illustrates an example method 500, according to embodiments of the present technology. At block 502, the example method 500 detects an object in sensor data captured in an environment. At block 504, the example method 500 detects a marker in the sensor data captured in the environment. At block 506, the example method 500 determines a first location of the object in the environment based on a relative location of the object to the marker and a second location of the marker. Many variations to the example method are possible. It should be appreciated that there can be additional, fewer, or alternative steps performed in similar or alternative orders, or in parallel, within the scope of the various embodiments discussed herein unless otherwise stated.

It is contemplated that there can be many other uses, applications, and/or variations associated with the various embodiments of the present technology. For example, various embodiments of the present technology can learn, improve, and/or be refined over time.

Example Implementations

Figure 6:
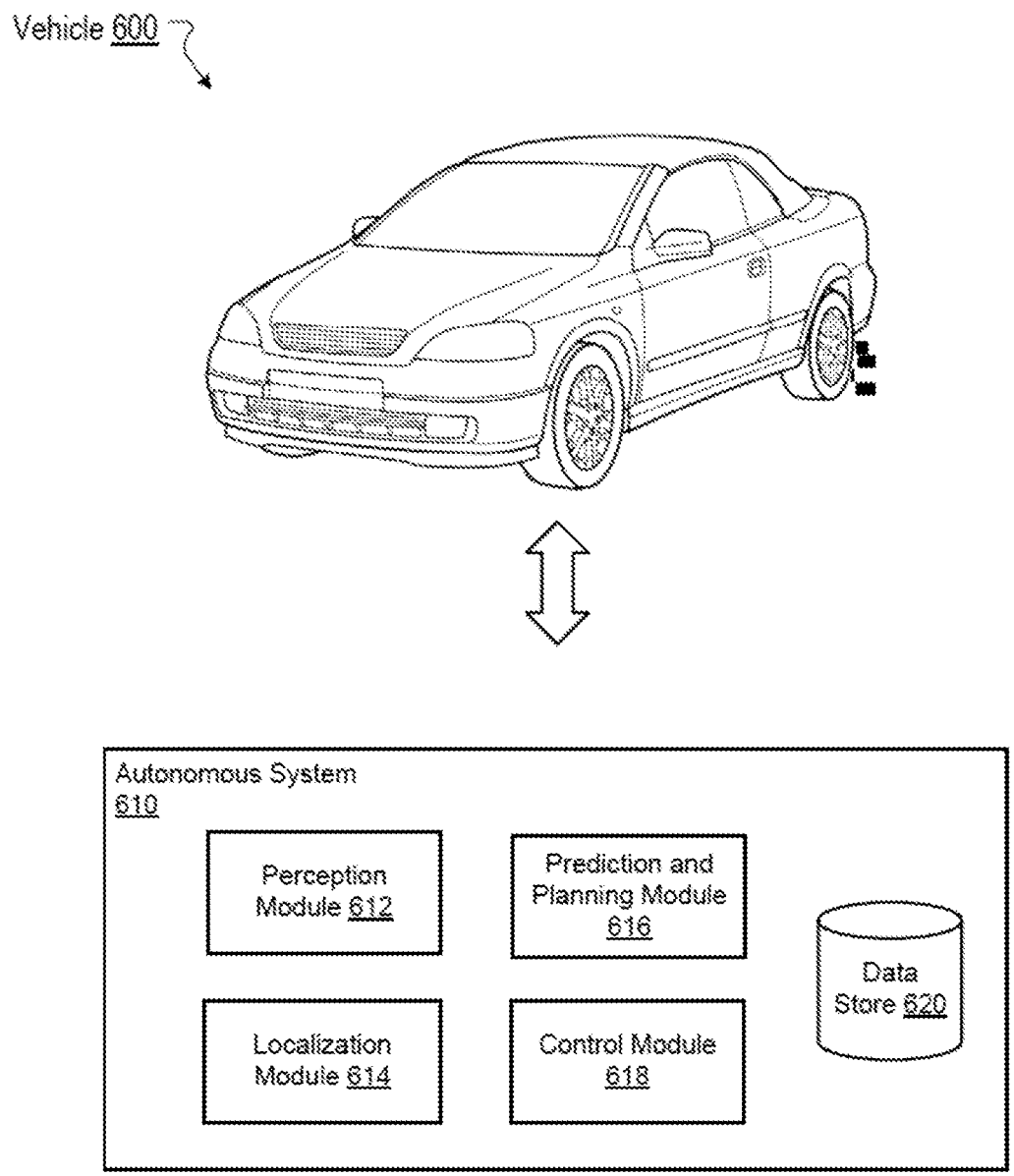
FIG. 6 illustrates an example vehicle, according to embodiments of the present technology.

FIG. 6 illustrates a vehicle 600 including an autonomous system 610, according to various embodiments of the present technology. The functionality and operation of the present technology, including the autonomous system 610, can be implemented in whole or in part by the vehicle 600. The present technology can cause desired control and navigation of the vehicle 600, as described herein. In some embodiments, the vehicle 600 is a passenger vehicle (e.g., sedan, coupe, SUV). In some embodiments, the vehicle 600 is a truck, which can include a trailer. The truck can be of any size (e.g., medium truck, heavy truck, very heavy truck, etc.) or weight (e.g., greater than 14,000 pounds, greater than 26,000 pounds, greater than 70,000 pounds, etc.). The autonomous system 610 of the vehicle 600 can support and execute various modes of navigation of the vehicle 600. The autonomous system 610 can support and execute an autonomous driving mode, a semi-autonomous driving mode, and a driver assisted driving mode of the vehicle 600. The autonomous system 610 also can enable a manual driving mode. For operation of the vehicle 600, the autonomous system 610 can execute or enable one or more of the autonomous driving mode, the semi-autonomous driving mode, the driver assisted driving mode, and the manual driving mode, and selectively transition among the driving modes based on a variety of factors, such as operating conditions, vehicle capabilities, and driver preferences.

In some embodiments, the autonomous system 610 can include, for example, a perception module 612, a localization module 614, a prediction and planning module 616, and a control module 618. The functionality of the perception module 612, the localization module 614, the prediction and planning module 616, and the control module 618 of the autonomous system 610 are described in brief for purposes of illustration. The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the autonomous system 610 can be implemented in any suitable combinations.

The perception module 612 can receive and analyze various types of data about an environment in which the vehicle 600 is located. Through analysis of the various types of data, the perception module 612 can perceive the environment of the vehicle 600 and provide the vehicle 600 with critical information so that planning of navigation of the vehicle 600 is safe and effective. For example, the perception module 612 can determine the pose, trajectories, size, shape, and type of obstacles in the environment of the vehicle 600. Various models, such as machine learning models, can be utilized in such determinations.

The various types of data received by the perception module 812 can be any data that is supportive of the functionality and operation of the present technology. For example, the data can be attributes of the vehicle 600, such as location, velocity, acceleration, weight, and height of the vehicle 600. As another example, the data can relate to topographical features in the environment of the vehicle 600, such as traffic lights, road signs, lane markers, landmarks, buildings, structures, trees, curbs, bodies of water, etc. As yet another example, the data can be attributes of dynamic obstacles in the surroundings of the vehicle 600, such as location, velocity, acceleration, size, type, and movement of vehicles, persons, animals, road hazards, etc.

Sensors can be utilized to capture the data. The sensors can include, for example, cameras, radar, LiDAR (light detection and ranging), GPS (global positioning system), IMUs (inertial measurement units), and sonar. The sensors can be appropriately positioned at various locations (e.g., front, back, sides, top, bottom) on or in the vehicle 600 to optimize the collection of data. The data also can be captured by sensors that are not mounted on or in the vehicle 600, such as data captured by another vehicle (e.g., another truck) or by non-vehicular sensors located in the environment of the vehicle 600.

The localization module 614 can determine the pose of the vehicle 600. Pose of the vehicle 600 can be determined in relation to a map of an environment in which the vehicle 600 is travelling. Based on data received by the vehicle 600, the localization module 614 can determine distances and directions of features in the environment of the vehicle 600. The localization module 614 can compare features detected in the data with features in a map (e.g., HD map) to determine the pose of the vehicle 600 in relation to the map. The features in the map can include, for example, traffic lights, crosswalks, road signs, lanes, road connections, stop lines, etc. The localization module 614 can allow the vehicle 600 to determine its location and pose with a high level of precision that supports optimal navigation of the vehicle 600 through the environment.

The prediction and planning module 616 can plan motion of the vehicle 600 from a start location to a destination location. The prediction and planning module 616 can generate a route plan, which reflects high level objectives, such as selection of different roads to travel from the start location to the destination location. The prediction and planning module 616 also can generate a behavioral plan with more local focus. For example, a behavioral plan can relate to various actions, such as changing lanes, merging onto an exit lane, turning left, passing another vehicle, etc. In addition, the prediction and planning module 616 can generate a motion plan for the vehicle 800 that navigates the vehicle 600 in relation to the predicted location and movement of other obstacles so that collisions are avoided. The prediction and planning module 616 can perform its planning operations subject to certain constraints. The constraints can be, for example, to ensure safety, to minimize costs, and to enhance comfort.

Based on output from the prediction and planning module 616, the control module 618 can generate control signals that can be communicated to different parts of the vehicle 600 to implement planned vehicle movement. The control module 618 can provide control signals as commands to actuator subsystems of the vehicle 600 to generate desired movement. The actuator subsystems can perform various functions of the vehicle 600, such as braking, acceleration, steering, signaling, etc.

The autonomous system 610 can include a data store 620. The data store 620 can be configured to store and maintain information that supports and enables operation of the vehicle 600 and functionality of the autonomous system 610. The information can include, for example, instructions to perform the functionality of the autonomous system 610, data captured by sensors, data received from a remote computing system, parameter values reflecting vehicle states, localization data, machine learning models, algorithms, vehicle operation rules and constraints, navigation plans, etc.

The autonomous system 610 of the vehicle 600 can communicate over a communications network with other computing systems to support navigation of the vehicle 600. The communications network can be any suitable network through which data can be transferred between computing systems. Communications over the communications network involving the vehicle 600 can be performed in real time (or near real time) to support navigation of the vehicle 600.

The autonomous system 610 can communicate with a remote computing system (e.g., server, server farm, peer computing system) over the communications network. The remote computing system can include an autonomous system, and perform some or all of the functionality of the autonomous system 610. In some embodiments, the functionality of the autonomous system 610 can be distributed between the vehicle 600 and the remote computing system to support navigation of the vehicle 600. For example, some functionality of the autonomous system 610 can be performed by the remote computing system and other functionality of the autonomous system 610 can be performed by the vehicle 600. In some embodiments, a fleet of vehicles including the vehicle 600 can communicate data captured by the fleet to a remote computing system controlled by a provider of fleet management services. The remote computing system in turn can aggregate and process the data captured by the fleet. The processed data can be selectively communicated to the fleet, including vehicle 600, to assist in navigation of the fleet as well as the vehicle 600 in particular. In some embodiments, the autonomous system 610 of the vehicle 600 can directly communicate with a remote computing system of another vehicle. For example, data captured by the other vehicle can be provided to the vehicle 600 to support navigation of the vehicle 600, and vice versa. The vehicle 600 and the other vehicle can be owned by the same entity in some instances. In other instances, the vehicle 600 and the other vehicle can be owned by different entities.

In various embodiments, the functionalities described herein with respect to the present technology can be implemented, in part or in whole, as software, hardware, or any combination thereof. In some cases, the functionalities described with respect to the present technology can be implemented, in part or in whole, as software running on one or more computing devices or systems. In a further example, the functionalities described with respect to the present technology can be implemented using one or more computing devices or systems that include one or more servers, such as network servers or cloud servers. It should be understood that there can be many variations or other possibilities.

Figure 7:
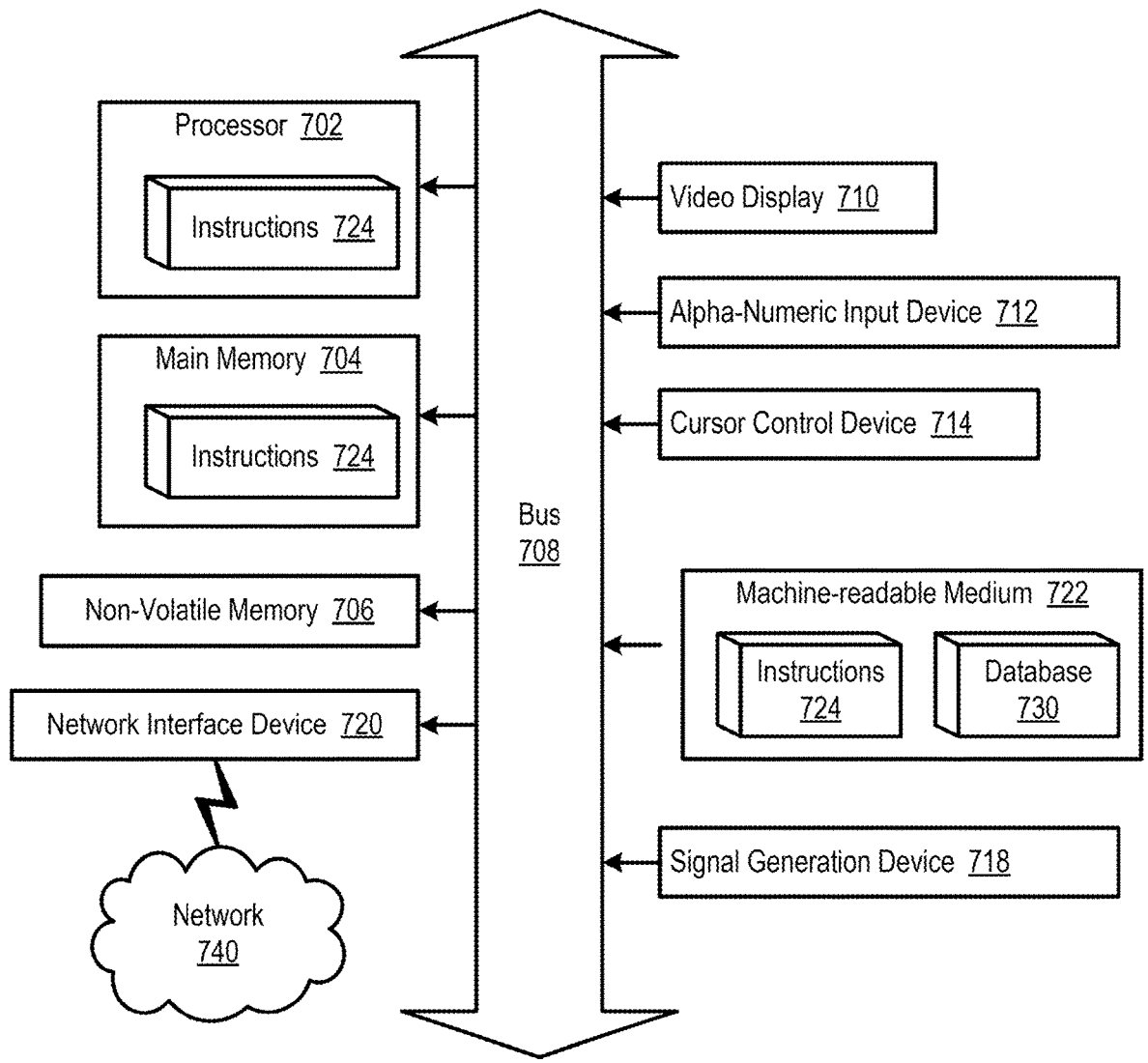
FIG. 7 illustrates an example computing system, according to embodiments of the present technology.

FIG. 7 illustrates an example of a computer system 700 that may be used to implement one or more of the embodiments of the present technology. The computer system 700 can be included in a wide variety of local and remote machine and computer system architectures and in a wide variety of network and computing environments that can implement the functionalities of the present technology. The computer system 700 includes sets of instructions 724 for causing the computer system 700 to perform the functionality, features, and operations discussed herein. The computer system 700 may be connected (e.g., networked) to other machines and/or computer systems. In a networked deployment, the computer system 700 may operate in the capacity of a server or a client machine in a client-server network environment, or as a peer machine in a peer-to-peer (or distributed) network environment.

The computer system 700 includes a processor 702 (e.g., a central processing unit (CPU), a graphics processing unit (GPU), or both), a main memory 704, and a nonvolatile memory 706 (e.g., volatile RAM and non-volatile RAM, respectively), which communicate with each other via a bus 708. In some embodiments, the computer system 700 can be a desktop computer, a laptop computer, personal digital assistant (PDA), or mobile phone, for example. In one embodiment, the computer system 700 also includes a video display 710, an alphanumeric input device 712 (e.g., a keyboard), a cursor control device 714 (e.g., a mouse), a signal generation device 718 (e.g., a speaker), and a network interface device 720.

In one embodiment, the video display 710 includes a touch sensitive screen for user input. In one embodiment, the touch sensitive screen is used instead of a keyboard and mouse. The machine-readable medium 722 on which is stored one or more sets of instructions 724 (e.g., software) embodying any one or more of the methodologies, functions, or operations described herein. The instructions 724 can also reside, completely or at least partially, within the main memory 704 and/or within the processor 702 during execution thereof by the computer system 700. The instructions 724 can further be transmitted or received over a network 740 via the network interface device 720. In some embodiments, the machine-readable medium 922 also includes a database 730.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 706 may also be a random access memory. The non-volatile memory 706 can be a local device coupled directly to the rest of the components in the computer system 700. A non-volatile memory that is remote from the system, such as a network storage device coupled to any of the computer systems described herein through a network interface such as a modem or Ethernet interface, can also be used.

While the machine-readable medium 722 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

In general, routines executed to implement the embodiments of the invention can be implemented as part of an operating system or a specific application, component, program, object, module, or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 700 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually affect the distribution.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment," "other embodiments," "another embodiment," "in various embodiments," "in an example," "in one implementation," or the like means that a particular feature, design, structure, or characteristic described in connection with the embodiment is included in at least one embodiment of the technology. The appearances of, for example, the phrases "according to an embodiment," "in one embodiment," "in an embodiment," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in method, computer readable medium, and apparatus modes.

Further, each of the various elements of the invention and claims may also be achieved in a variety of manners. This technology should be understood to encompass each such variation, be it a variation of an embodiment of any apparatus (or system) embodiment, a method or process embodiment, a computer readable medium embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A computer-implemented method comprising:
   detecting, by a computing system, an object in sensor data captured in an environment;
   detecting, by the computing system, a marker in the sensor data captured in the environment;
   determining, by the computing system, a first location of the object in the environment based on a relative location of the object with respect to the marker and a second location of the marker;
   providing, by the computing system, localization of the object with respect to a map associated with the environment to a vehicle in the environment; and
   causing, by the computing system, navigation of the vehicle to avoid the object based on the localization of the object.

2. The computer-implemented method of claim 1, wherein the second location of the marker is in the map associated with the environment, and wherein the map includes information that describes at least one of a shape, a form, and a feature of the marker.

3. The computer-implemented method of claim 1, wherein the marker is in a set of markers, and the second location of the marker is determined based on a pattern associated with the set of markers.

4. The computer-implemented method of claim 1, further comprising:
   determining, by the computing system, a third location of the object in the environment without distance estimation of the object with respect to a sensor in the environment; and
   determining, by the computing system, a velocity of the object based on the first location and the third location.

5. The computer-implemented method of claim 1, further comprising:
   estimating, by the computing system, an estimated location of the marker;
   comparing, by the computing system, the estimated location of the marker with the second location of the marker; and
   calibrating, by the computing system, a sensor associated with the sensor data based on the estimated location and the second location.

6. The computer-implemented method of claim 1, wherein the first location of the object is determined based on a machine learning model, and wherein the machine learning model is trained based on training data that include instances of sensor data captured at the environment with one or more markers.

7. The computer-implemented method of claim 1, further comprising:
   detecting, by the computing system, a key point of the object, wherein the first location is determined based on the key point of the object.

8. The computer-implemented method of claim 1, wherein the relative location of the object with respect to the marker is determined based on a number of pixels between a first pixel of the object in the sensor data and a second pixel of the marker in the sensor data.

9. The computer-implemented method of claim 1, further comprising:
   identifying, by the computing system, the object based on the relative location of the object with respect to the marker; and
   providing, by the computing system, an identification of the object based on the relative location of the object with respect to the marker.

10. A system comprising:
    at least one processor; and
    a memory storing instructions that, when executed, cause the system to perform operations comprising:

detecting an object in sensor data captured in an environment;
detecting a marker in the sensor data captured in the environment;
determining a first location of the object in the environment based on a relative location of the object to the marker and a second location of the marker;
providing localization of the object with respect to a map associated with the environment to a vehicle in the environment; and
causing navigation of the vehicle to avoid the object based on the localization of the object.

11. The system of claim 10, wherein the second location of the marker is in the map associated with the environment, and wherein the map includes information that describes at least one of a shape, a form, and a feature of the marker.

12. The system of claim 10, wherein the marker is in a set of markers, and the second location of the marker is determined based on a pattern associated with the set of markers.

13. The system of claim 10, the operations further comprising:
determining a third location of the object in the environment without distance estimation of the object with respect to a sensor in the environment; and
determining a velocity of the object based on the first location and the third location.

14. The system of claim 10, the operations further comprising:
estimating an estimated location of the marker;
comparing the estimated location of the marker with the second location of the marker; and
calibrating a sensor associated with the sensor data based on the estimated location and the second location.

15. A non-transitory computer-readable storage medium including instructions that, when executed, cause a computing system to perform operations comprising:
detecting an object in sensor data captured in an environment;
detecting a marker in the sensor data captured in the environment;
determining a first location of the object in the environment based on a relative location of the object to the marker and a second location of the marker;
providing localization of the object with respect to a map associated with the environment to a vehicle in the environment; and
causing navigation of the vehicle to avoid the object based on the localization of the object.

16. The non-transitory computer-readable storage medium of claim 15, wherein the second location of the marker is in the map associated with the environment, and wherein the map includes information that describes at least one of a shape, a form, and a feature of the marker.

17. The non-transitory computer-readable storage medium of claim 15, wherein the marker is in a set of markers, and the second location of the marker is determined based on a pattern associated with the set of markers.

18. The non-transitory computer-readable storage medium of claim 15, the operations further comprising:
determining a third location of the object in the environment without distance estimation of the object with respect to a sensor in the environment; and
determining a velocity of the object based on the first location and the third location.

19. The non-transitory computer-readable storage medium of claim 15, the operations further comprising:
estimating an estimated location of the marker;
comparing the estimated location of the marker with the second location of the marker; and
calibrating a sensor associated with the sensor data based on the estimated location and the second location.

20. The system of claim 1, wherein the first location of the object is determined based on a machine learning model, and wherein the machine learning model is trained based on training data that include instances of sensor data captured at the environment with one or more markers.

* * * * *